Patented Jan. 5, 1954

2,665,264

UNITED STATES PATENT OFFICE 2,665,264

COMPOUNDING BUTYL RUBBER

Marvin C. Brooks, Packanack Lake, and Elbert C. Ladd, Passaic, N. J., assignors to United States Rubber Company, New York, N. Y., a corporation of New Jersey No Drawing. Application November 13, 1951, Serial No. 256,144

15 Claims. (Cl. 260—41.5)

This invention relates to a means of effecting substantial improvements in the properties of Butyl rubber vulcanizates which are filled with precipitated hydrated silica, precipitated hydrated calcium silicate or kaolin.

The invention is based upon our discovery that the physical characteristics of Butyl rubber stocks filled with precipitated hydrated silica, precipitated hydrated calcium silicate or kaolin are materially improved by reacting the filler with certain unsaturated organohalosilanes. The physical characteristics thereby improved are the tensile strength—especially "hot" tensile strength—modulus, and permanent set. In many cases the hysteresis of the stock is also lowered. Our invention effects especially pronounced increases in tensile strength and in modulus, and an important decrease in permanent set.

The unsaturated organohalosilanes which are employed in accordance with our invention are the cycloalkenylhalosilanes, and cycloalkylhalosilanes.

With reference to the number of unsaturated organic groups and halogen groups substituted on the silicon of the silane, we can use any unsaturated organohalosilane having the general formula $R_nSiX_{4-n}$ where R is cycloalkenyl or cycloalkenylalkyl, $n$ is a positive interger equal to 1, 2 or 3, and X is halogen. We prefer however to employ those silanes wherein $n$ is equal is 1, i. e., those containing 3 atoms of halogen substituted on the silicon.

We prefer to employ those trichlorosilanes containing a cyclohexenyl group, or cyclohexenylalkyl group attached directly to the silicon. Two of these compounds which we particularly prefer to employ are cyclohexenyltrichlorosilane and beta-(3-cyclohexenyl)ethyltrichlorosilane.

We prefer to employ those unsaturated halosilanes wherein the halogen is chlorine although we can employ those wherein the halogen is bromine or iodine.

The improvements in properties brought about by the use of the cycloalkenylhalosilanes and the cycloalkenylalkylhalosilanes are not obtained by the use of the corresponding saturated organohalosilanes, nor by the use of the alkylhalosilanes, arylhalosilanes, or the common alkenylhalosilanes such as vinylhalosilane, allylhalosilane and butenylhalosilane.

Butyl stocks containing our fillers treated with alkylhalosilanes have lower hysteresis than stocks filled with the untreated fillers. However, the treatment brings about no reinforcement in modulus, or hot tensile strength. Arylhalosilane treated fillers have very little effect in modifying the properties of Butyl vulcanizates. When vinylhalosilane, allylhalosilane, or butenylhalosilane are used as treating agents for our fillers, and the fillers so treated are compounded in Butyl and vulcanized with sulfur, the properties of the vulcanizates are not improved over those of the control containing untreated silica. With vinylhalosilane the properties are actually affected adversely; the vulcanized products appear to be in two phases—one a very dark overcured phase, and the other a light-colored uncured phase. These two-phase vulcanizates are dough-like and lack the properties usually associated with Butyl rubber vulcanizates. Accordingly, they are not suitable for the usual applications of Butyl rubber, e. g., as inner tube stock.

As the filler we can use a precipitated hydrated silica, a precipitated hydrated calcium silicate or a kaolin. The filler used should have a particle size not greated than 10 microns.

The fillers operative in our invention adsorb water under normal atmospheric conditions and are generally obtained with an adsorbed film of water. This may be taken as an indication of the hydrated nature of their surface. In general, fillers with water of hydration amounting to not less than 0.02 gram per 100 square meters of surface area are preferred in our invention.

Those fillers which have been prepared or dried at high temperatures (500° F. or higher) are not appreciably changed in their reinforcing properties by the treatment of our invention. An example of such a filler is one made in accordance with the U. S. Patent 2,535,036.

We believe the important feature of the fillers used in our invention is that they contain hydroxyl groups which are chemically bound to the matrix of the filler. In the case of the hydrated silica and calcium silicate the OH groups are bonded to the silicon atoms and in kaolin the OH groups are bonded to aluminum atoms. For a pertinent discussion see L. Pauling, "The Nature of the Chemical Bond," Cornell University Press, 1940. We have obtained good results with a finely divided hydrated silica (ca. 200 Angstrom units in diameter) known as "Hi-Sil" which has a surface area of 150 square meters per gram and a degree of hydration equal to 0.073 gram of moisture per 100 square meters of surface area. We have also successfully used a fine particle hydrated silica (ca. 250 Angstrom units in diameter) prepared by removal of water from an aqueous dispersion of hydrated silica known as "Ludox" and having a surface area of 125 square meters per gram and a degree of hydration equal to 0.046 gram of moisture per 100 square meters of surface area. We have obtained good results with a filler known as "Silene EF" which is a precipitated hydrated calcium silicate of a particle size of about 300 Angstrom units diameter and which contains 13-19 per cent of water by weight. We have also successfully used clays of the type commonly used as reinforcing fillers in rubber, an example being the rubber filler known commercially as "Suprex" clay which is a kaolin having plate-like particles of a wide distribution of sizes averaging approximately 5000 Angstrom units and having a degree of hydration of 14.1% of water (by weight). All of these fillers respond well to the treatment of our invention and have an average particle size not greater than 10 microns and a degree of hydration not less than 0.02 gram of moisture per 100 square meters of surface area.

The amount of the organohalosilane used for treating the filler in accordance with our invention can vary widely, depending upon numerous factors. Generally speaking we employ an amount of silane equal to from 5 to 15% of the weight of the filler.

One method of carrying out the process of our invention comprises treating the filler with the organohalosilane prior to incorporation with the Butyl rubber. In effecting such pre-treatment of the filler with the organohalosilane, we have used both a solution method and a vapor phase method. In the solution method, we slurry the filler to be treated in a low boiling hydrocarbon vehicle, add the unsaturated organohalosilane to the resulting slurry, heat the mixture to reflux and continue to heat at reflux until substantially all of the silane has reacted with the filler.

The amount of liquid vehicle required to form a smooth flowing slurry varies from filler to filler. The fillers of larger particle size do not occupy such a large bulk as those of finer particle size and consequently require less liquid. Approximately 4 to 7 times as much liquid vehicle (by weight) as filler is usually used with the fillers described herein. The paraffin hydrocarbons such as petroleum ether, are preferred because they are inert with respect to the organohalosilane and the hydrogen halide which is formed by the reaction and at the same time are good solvents for the organohalosilane. Moreover liquid paraffins are readily available at low cost.

A reflux time of 3 hours is sufficient for most filler-organohalosilane reactions to go to substantial completion. Any unreacted chlorine groups can be hydrolyzed with water or can be allowed to remain since they do not affect vulcanization to any appreciable extent.

After the reaction of the filler with the silane is substantially complete, the filler is separated from the liquid, as by filtration or centrifuging, after which residual solvent is evaporated by moderate heating.

In the vapor phase method of pre-treating the filler, we simply place the filler in a tube and pass air saturated with the organohalosilane through the tube, making suitable provision to trap out unreacted silane and the hydrogen halide formed by the reaction from the effluent gas.

The organohalosilane-treated fillers of our invention are new compositions of matter. They are stable over indefinitely prolonged periods of time and can be transported as articles of commerce. Their utility is evidenced by their usefulness in rubber compounding.

Instead of pre-treating the filler with the silane, we can effect filler treatment "in situ," i. e., by incorporating the silane directly with the Butyl rubber and the filler on the conventional rubber mill or in the conventional internal rubber mixer. The improvement in physical properties of the resulting vulcanizate is of the same character as when the filler is pre-treated with the silane in the manner described above.

When the organohalosilane is reacted "in situ," we much prefer to subject the mixture of Butyl rubber, filler and silane to a hot milling step at an elevated temperature of the order of from 250° to 400° F. This hot milling step is carried out prior to the addition of the zinc oxide and vulcanizing agents to the rubber. The zinc oxide and vulcanizing ingredients are thereafter incorporated in the resulting mixture at a relatively low temperature, and the mixture is then vulcanized in the conventional manner. We prefer to delay the introduction of zinc oxide and vulcanizing agents until after reaction between the filler and the silane has been completed because when the zinc oxide and vulcanizing agents are present during the hot milling step they react with the silane, thereby reducing the extent of improvement of the physical properties of the vulcanizate.

Because hydrogen halide, usually hydrogen chloride, is a product of the reaction of the silanes with the fillers, when the "in situ" reaction of the silane as just described is practiced it is highly desirable to provide good ventilation during the mixing operations. We have also found it desirable to add an alkaline earth metal carbonate, e. g. calcium carbonate or barium carbonate, to the mixture of Butyl rubber, filler and silane, in an amount sufficient to neutralize all of the hydrogen halide formed by reaction of the filler and the silane. The use of about 5 parts of finely divided calcium carbonate per 100 of Butyl rubber is generally sufficient.

An example of a potential use of the vulcanizates of our invention is in the manufacture of inner tubes for pneumatic tires. Heretofore, carbon black has been the only filler having suitable reinforcing properties for use in first quality automotive inner tubes. Our invention makes feasible the manufacture of Butyl inner tubes of first quality from stocks in which the carbon black has been completely replaced by white fillers such as the aforementioned "Hi-Sil," "Silene EF" or rubber-filling clays like "Suprex" clay. It is highly advantageous to be able to replace carbon black with a cheap white filler like the clays which have heretofore been considered to be far inferior to carbon black as rubber fillers.

The following examples more fully illustrate our invention. The data on physical properties reported in these examples were obtained at room temperature unless otherwise noted. Stress strain properties were measured by conventional ASTM methods. The stress at 300% elongation (S-300) has been taken as a measure of modulus. Set was determined at break after 30 seconds rather than after 10 minutes as recommended by ASTM. Hysteresis results were determined at 280° F. on a torsional hysterometer (see M. Mooney and R. H. Gerke, India Rubber World, 103, 29 (1941)). Durometer hardness was measured as Shore A durometer after 5 seconds. All parts are by weight.

*Example I*

The aforementioned "Ludox" silica was treated with 10% by weight of cyclohexenyltrichlorosilane by our solution method. The treated silica was then incorporated in a Butyl rubber stock having the formulation given below.

| | |
|---|---|
| Butyl rubber | 100 |
| Zinc oxide | 5 |
| Stearic acid | 1 |
| Sulfur | 1.5 |
| Accelerators | 2.5 |
| Filler | 54 |

A control stock containing untreated "Ludox" silica was also prepared. The stock were press-cured 60 minutes at 307° F. The modulus and torsional hysteresis of the vulcanizates were as follows:

| | Modulus (S-300) | 280° F. torsional hysteresis |
|---|---|---|
| Control | 440 | 0.23 |
| Treated filler | 1,020 | .18 |

*Example II*

"Hi-Sil" silica was treated with cyclohexenyltrichlorosilane by our solution method. Fifty-four parts of the thus treated filler were incorporated into a Butyl rubber compound similar to that employed in Example I. A control compound containing untreated "Hi-Sil" silica was also prepared. The two Butyl mixes were press-cured for 40 minutes at 307° F. The modulus and torsional hysteresis of the resultant vulcanizates were as follows:

| | Modulus (S-300) | 280° F. torsional hysteresis |
|---|---|---|
| Control | 285 | 0.38 |
| Treated filler | 920 | .20 |

Examples I and II clearly illustrate the marked improvement in modulus and reduction in hysteresis obtained by pre-treating the filler in accordance with the present invention.

*Example III*

This example illustrates the "in situ" treatment of "Hi-Sil" silica with cyclohexenyltrichlorosilane.

The following ingredients were milled together on a cold mill.

| | |
|---|---|
| Butyl rubber | 90 |
| "Hi-Sil" silica | 54 |
| Stearic acid | 1 |
| Calcium carbonate | 5 |

Four parts of cyclohexenyltrichlorosilane were then added to the compound and the resultant mixture was milled for 10 minutes at 300° F. to effect substantially complete reaction of the silane with the "Hi-Sil" silica. The mixture was then allowed to cool to about 150° F. whereupon the following ingredients were added:

| | |
|---|---|
| Butyl rubber | 10 |
| Zinc oxide | 5 |
| Accelerator | 2.5 |
| Sulfur | 1.5 |

The resulting mix was press-cured for 80 minutes at 307° F. A control from which the silane was omitted was similarly compounded and cured.

The physical characteristics of the vulcanizates were as follows:

| | Durometer | Tensile (R. T.) | Percent elongation | Percent set | Modulus (S-300) | 280° F. torsional hysteresis |
|---|---|---|---|---|---|---|
| Control | 65 | 1530 | 720 | 61 | 400 | 0.43 |
| Treated | 61 | 1670 | 500 | 23 | 800 | .39 |

*Example IV*

As has been indicated previously, those silicas prepared by a fuming process respond less to the methods of our invention than do those silicas having a hydrated surface such as the precipitated silicas. This is demonstrated in the present example.

The procedure of Example III was duplicated except that the "Hi-Sil" silica was replaced with a very fine particle size (ca. 60 Angstrom units diameter) fumed silica (made by the method of U. S. Pat. 2,535,036) having a surface area of 500 square meters per gram and containing only 0.006 gram of moisture per 100 square meters of surface area. A vulcanizate was also prepared in which the "in situ" treatment of the filler with the cyclohexenyltrichlorosilane was omitted. This vulcanizate was used as the control. The physical properties of the vulcanizates were as follows:

| | Modulus (S-300) | 280° F. torsional hysteresis |
|---|---|---|
| Control | 375 | 0.292 |
| Treated | 550 | .485 |

It will be seen that the filler of Example IV responded to the treatment with the cyclohexenyltrichlorosilane to a lesser extent than did the filler of Example III. This is attributed to the lesser extent of surface hydration present in silica prepared by the fuming method. These results are consistent with experiments we have conducted which demonstrate that when "Hi-Sil" silica is dried it does not respond well to treatment with the silane as judged by vulcanizate properties.

*Example V*

This example shows a comparison of cyclohexenyltrichlorosilane and the corresponding saturated organochlorosilane-cyclohexyl trichlorosilane—as treating agents for silica fillers to be compounded in Butyl rubber. The data show the important effect on modulus reinforcement, etc., that is due to the double bond in the cyclohexene ring.

A quantity of "Hi-Sil" silica was treated with 10% by weight of cyclohexenyltrichlorosilane and a second quantity of "Hi-Sil" silica was treated with a similar amount of cyclohexyltrichlorosilane. The thus-treated silicas were each incorporated in a separate Butyl rubber stock having the following formulation:

| | |
|---|---|
| Butyl rubber | 100 |
| Zinc oxide | 5 |
| Stearic acid | 1 |
| Sulfur | 1.5 |
| Accelerators | 2.5 |
| Treated "Hi-Sil" silica | 54 |

The resulting stocks, together with a control containing 54 parts of untreated "Hi-Sil" silica in place of the treated "Hi-Sil" silica, were press-cured 60° minutes at 307° F. The physical properties of the vulcanizates were as follows:

| "Hi-Sil" silica | R. T. tensile | Set at break | Modulus (S-300) | 212° F. tensile |
|---|---|---|---|---|
| Control | 1,520 | 52 | 425 | 820 |
| Cyclohexenyltrichlorosilane treated | 1,750 | 21 | 950 | 1,000 |
| Cyclohexyltrichlorosilane treated | 1,550 | 36 | 345 | 495 |

It will be noted that treatment with the cyclohexenyltrichlorosilane gave a much greater increase in tensile, especially the 212° F. tensile, a greater improvement in permanent set, and a much higher modulus than was obtained by treatment with the cyclohexyltrichlorosilane.

*Example VI*

This example illustrates the use of "Silene EF" calcium silicate, pre-treated with cyclohexenyltrichlorosilane, in Butyl stocks.

Fifty-eight parts of "Silene EF," pre-treated with 10% of its weight of cyclohexenyltrichlorosilane, were substituted for the treated "Hi-Sil" silica in the Butyl formulation of Example V. The resultant mixture was milled and then cured for 60 minutes at 307° F. A similar vulcanizate was also prepared containing untreated "Silene EF," as the control. The physical properties of the vulcanizates are shown in the following table.

| "Silene EF," calcium silicate | Durometer | R. T. tensile | R. T. elong. | Set at break | Modulus (S-300) | 212° F. tensile | 280° F. tors. hyst. |
|---|---|---|---|---|---|---|---|
| Control | 60 | 1,270 | 640 | 28 | 485 | 305 | 0.214 |
| Pre-treated with cyclohexenyltrichlorosilane | 52 | 1,540 | 630 | 20 | 660 | 625 | .128 |

*Example VII*

This example illustrates the use of "Hi-Sil" silicas pre-treated with beta-(3-cyclohexenyl) ethyltrichlorosilane, and cyclohexenyltrichlorosilane in Butyl stocks.

The Butyl stocks were compounded as in Example V except that "Hi-Sil" silicas, pre-treated with beta-(3-cyclohexenyl)-ethyltrichlorosilane, and cyclohexenyltrichlorosilane respectively were each used as a filler in one of the stocks in place of the filler employed in Example V. The Butyl mixtures were cured for 60 minutes at 307° F. The physical properties of the vulcanizates were as follows:

| "Hi-Sil" silica pre-treated with— | Durometer | R. T. tensile | R. T. elong. | Set at break | Modulus (S-300) | 212° F. tensile | Tors. hyst. |
|---|---|---|---|---|---|---|---|
| Beta-(3-cyclohexenyl) ethyltrichlorosilane | 65 | 2,080 | 570 | 24 | 900 | | 0.28 |
| Cyclohexenyltrichlorosilane | 64 | 1,750 | 480 | 21 | 950 | 1,000 | .21 |

The improvement in physical properties achieved by pre-treatment of the filler with these chemicals is evident when the above data are compared with those of the control in Example V.

*Example VIII*

This example illustrates the use of cyclohexenyltrichlorosilane pre-treated "Suprex" clay in Butyl vulcanizates and the improvement in the physical properties of the vulcanizate thereby obtained.

Seventy-two parts of "Suprex" clay, pretreated with 10% by weight of cyclohexenyltrichlorosilane, were substituted for the pre-treated "Hi-Sil" silica in the Butyl formulation of Example V. The ingredients were milled together and the resultant mixture cured for 60 minutes at 307° F. A vulcanizate was also prepared containing untreated "Suprex" clay. The physical properties of the vulcanizates were measured and are shown in the following table.

| "Suprex" clay | Durometer | R. T. tensile | R. T. elong. | Set at break | Modulus (S-300) | 212° F. tensile | Tors. hyst. |
|---|---|---|---|---|---|---|---|
| Control | 51 | 920 | 500 | 38 | 500 | 290 | 0.15 |
| Pre-treated with cyclohexenyltrichlorosilane | 54 | 1,130 | 330 | 12 | 1,050 | 560 | .07 |

Scrutiny of the physical properties shown in Examples V, VI, VII and VIII shows the comparable improvements in physical properties of Butyl rubber vulcanizates obtainable with a variety of siliceous fillers, by treatment thereof with various chemicals of the class set forth.

*Example IX*

This example shows the use of two additional cycloalkenylalkylhalosilanes in the process of our invention and the improved Butyl vulcanizates thereby obtained.

In the same manner as before, we treated "Hi-Sil" with 10% by weight of the following silanes:

I. 6-methyl-3-cyclohexenyltrichlorosilane
II. 3-methyl-3-cyclohexenyltrichlorosilane The treated fillers were then incorporated in the following Butyl rubber formulation.

| | |
|---|---|
| Butyl | 100 |
| Zinc oxide | 3 |
| Stearic acid | 1 |
| Sulfur | 1.5 |
| Accelerators | 2.5 |
| Treated "Hi-Sil" silica | 54 |

The stocks were cured 40 minutes at 307° F. The physical properties of the cured stocks are given in the following table.

| Filler | Modulus (S-300) | 280° F. torsional hysteresis |
|---|---|---|
| Hi-Sil treated with I | 925 | 0.12 |
| Hi-Sil treated with II | 900 | .17 |

From the foregoing description it will be seen that the present invention offers numerous advantages. The invention can be practised in a simple and economical manner. Treatment of the fillers in accordance with the invention brings about a remarkable improvement in the properties of the vulcanizates.

A major advantage of the invention is that it effects great improvement in the reinforcing properties of those fillers which have not been considered particularly good rubber reinforcing fillers. The invention enables such an improvement in the reinforcing action of poorly reinforcing fillers like kaolin as to cause it to closely approach or even exceed the reinforcing action of carbon black of the same particle size. It is also especially noteworthy that the invention enables the attainment of a greatly increased modulus and at the same time in some instances a greatly decreased hysteresis in the Butyl rubber vulcanizates made in accordance therewith. Many other advantages of our invention will be apparent to those skilled in the art.

We use the term "Butyl" herein in its commonly accepted sense, namely to designate a rubbery copolymer of a major proportion, typically 80 to 99.5%, of isobutylene and a minor proportion, typically 20 to 0.5%, of an aliphatic conjugated diolefin hydrocarbon, usually butadiene-1,3 or isoprene, the copolymer having an unsaturation below an iodine number of 50 and a molecular weight above 20,000 and being curable with sulfur to yield an elastic product.

Having thus described our invention, what we claim and desire to protect by Letters Patent is:

1. A vulcanizate of a mixture of a rubbery isobutylene-diolefin copolymer and a filler selected from the group consisting of precipitated hydrated silica, precipitated hydrated calcium silicate and kaolin, said filler having been reacted with an unsaturated organohalosilane selected from the group consisting of cycloalkenylhalosilanes and cycloalkenylalkylhalosilanes the halogen content of which is selected from the group consisting of chlorine, bromine and iodine, with the concurrent liberation of the corresponding hydrogen halide.

2. A vulcanizate of a mixture of a rubbery isobutylene-diolefin copolymer and a filler selected from the group consisting of precipitated hydrated silica, precipitated hydrated calcium silicate and kaolin, said filler having an average particle size not greater than 10 microns and having been reacted with an unsaturated organohalosilane selected from the group consisting of cycloalkenylhalosilanes and cycloalkenylalkylhalosilanes the halogen content of which is selected from the group consisting of chlorine, bromine and iodine, with the concurrent liberation of the corresponding hydrogen halide.

3. A vulcanizate of a mixture of a rubbery isobutylene-diolefin copolymer and a filler selected from the group consisting of precipitated hydrated silica, precipitated hydrated calcium silicate and kaolin, said filler having an average particle size not greater than 10 microns and having been reacted with cyclohexenyltrichlorosilane with the concurrent liberation of hydrogen chloride.

4. A vulcanizate of a mixture of a rubbery isobutylene-diolefin copolymer and a filler selected from the group consisting of precipitated hydrated silica, precipitated hydrated calcium silicate and kaolin, said filler having an average particle size not greater than 10 microns and having been reacted with beta-(3-cyclohexenyl) ethyltrichlorosilane with the concurrent liberation of hydrogen chloride.

5. A vulcanizate of a mixture of a rubbery isobutylene-diolefin copolymer and a filler selected from the group consisting of precipitated hydrated silica, precipitated hydrated calcium silicate and kaolin, said filler having an average particle size not greater than 10 microns and having been reacted with 6-methyl-3-cyclohexenyltrichlorosilane with the concurrent liberation of hydrogen chloride.

6. A vulcanizate of a mixture of a rubbery isobutylene-diolefin copolymer and a filler selected from the group consisting of precipitated hydrated silica, precipitated hydrated calcium silicate and kaolin, said filler having an average particle size not greater than 10 microns and having been reacted with 3-methyl-3-cyclohexenyltrichlorosilane with the concurrent liberation of hydrogen chloride.

7. As a new article of manufacture, a filler selected from the group consisting of precipitated hydrated silica, precipitated hydrated calcium silicate and kaolin, said filler having an average particle size not greater than 10 microns and having been reacted with an unsaturated organohalosilane selected from the group consisting of cycloalkenylhalosilanes and cycloalkenylalkylhalosilanes the halogen content of which is selected from the group consisting of chlorine, bromine and iodine, with the concurrent liberation of the corresponding hydrogen halide.

8. As a new article of manufacture, a filler selected from the group consisting of precipitated hydrated silica, precipitated hydrated calcium silicate and kaolin, said filler having an average particle size not greater than 10 microns and having been reacted with cyclohexenyltrichlorosilane with the concurrent liberation of hydrogen chloride.

9. As a new article of manufacture, a filler selected from the group consisting of precipitated hydrated silica, precipitated hydrated calcium silicate and kaolin, said filler having an average particle size not greater than 10 microns and having been reacted with beta-(3-cyclohexenyl)-ethyl trichlorosilane with the concurrent liberation of hydrogen chloride.

10. As a new article of manufacture, a filler selected from the group consisting of precipitated hydrated silica, precipitated hydrated calcium silicate and kaolin, said filler having an average particle size not greater than 10 microns and having been reacted with 6-methyl-3-cyclohexenyltrichlorosilane with the concurrent liberation of hydrogen chloride.

11. As a new article of manufacture, a filler selected from the group consisting of precipitated hydrated silica, precipitated hydrated calcium silicate and kaolin, said filler having an average particle size not greater than 10 microns and having been reacted with 3-methyl-3-cyclohexenyltrichlorosilane with the concurrent liberation of hydrogen chloride.

12. The process which comprises chemically reacting a filler selected from the group consisting of precipitated hydrated silica, precipitated hydrated calcium silicate and kaolin, said filler having an average particle size not greater than 10 microns, with an unsaturated organohalosilane selected from the group consisting of cycloalkenylhalosilanes and cycloalkenylalkylhalosilanes the halogen content of which is selected from the group consisting of chlorine, bromine and iodine, with the concurrent liberation of hydrogen halide, commingling the thus-reacted filler with a rubbery isobutylene-diolefin copolymer and with compounding ingredients including vulcanizing ingredients, and vulcanizing.

13. The process which comprises commingling a rubbery isobutylene-diolefin copolymer, a filler selected from the group consisting of precipitated hydrated silica, precipitated hydrated calcium silicate and kaolin, said filler having an average particle size not greater than 10 microns, and an unsaturated organohalosilane selected from the group consisting of cycloalkenylhalosilanes and cycloalkenylalkylhalosilanes the halogen content of which is selected from the group consisting of chlorine, bromine and iodine, heating the resulting mixture and thereby chemically reacting said filler with said organohalosilane with the concurrent liberation of hydrogen halide, subsequently incorporating vulcanizing ingredients with the resulting mixture, and vulcanizing.

14. The process of claim 13 wherein said commingling step is carried out in the presence of an alkaline earth metal carbonate in amount sufficient to neutralize all of the hydrogen halide liberated by reaction of said filler with said organohalosilane.

15. The process of claim 13 wherein zinc oxide is incorporated with the mixture after the reaction between said filler and said organohalosilane has been effected.

MARVIN C. BROOKS.
ELBERT C. LADD.

No references cited.